(12) United States Patent
Mercat

(10) Patent No.: US 8,231,135 B2
(45) Date of Patent: Jul. 31, 2012

(54) DEVICE FOR ADJUSTING THE TRAIL OF A CYCLE FRONT WHEEL ASSEMBLY, A WHEEL EQUIPPED WITH SUCH DEVICE, AND A METHOD OF USING SAME

(75) Inventor: Jean-Pierre Mercat, Chavanod (FR)

(73) Assignee: Salomon S.A.S., Metz-Tessy (FR)

( * ) Notice: Subject to any disclaimer, the term of this patent is extended or adjusted under 35 U.S.C. 154(b) by 641 days.

(21) Appl. No.: 12/266,679

(22) Filed: Nov. 7, 2008

(65) Prior Publication Data
US 2009/0121446 A1      May 14, 2009

(30) Foreign Application Priority Data
Nov. 8, 2007   (FR) ..................................... 07 07847

(51) Int. Cl.
*B62K 21/00*   (2006.01)
(52) U.S. Cl. ....................................... 280/276; 280/279
(58) Field of Classification Search .................. 280/274, 280/276, 279, 86.75, 86.751, 86.754, 86.758; 403/3, 4
See application file for complete search history.

(56) References Cited

U.S. PATENT DOCUMENTS

| | | | | |
|---|---|---|---|---|
| 5,215,324 A * | 6/1993 | Kawai | ........................... | 280/279 |
| 5,503,244 A | 4/1996 | Beirlein | | |
| 6,412,803 B1 * | 7/2002 | Lalikyan et al. | .............. | 280/276 |
| 6,474,432 B1 * | 11/2002 | Schmidt et al. | ............... | 180/209 |
| 6,926,297 B2 * | 8/2005 | Czysz | ........................... | 280/276 |
| 7,434,892 B2 | 10/2008 | Mercat et al. | | |
| 7,438,306 B2 * | 10/2008 | Mrdeza et al. | ................ | 280/279 |
| 7,472,918 B2 * | 1/2009 | Turner | ......................... | 280/284 |
| 2005/0206119 A1 * | 9/2005 | Czysz | ........................... | 280/276 |
| 2006/0108858 A1 | 5/2006 | Mercat et al. | | |
| 2007/0262556 A1 * | 11/2007 | Danelutti | ..................... | 280/276 |
| 2008/0018076 A1 | 1/2008 | Lagar | | |

FOREIGN PATENT DOCUMENTS

| | | |
|---|---|---|
| DE | 41 26 761 A1 | 2/1993 |
| DE | 102 29 740 A1 | 9/2003 |
| EP | 0 941 916 A1 | 9/1999 |
| FR | 2 744 980 A1 | 8/1997 |
| FR | 2 880 609 A1 | 7/2006 |
| WO | WO-2006/056869 A2 | 6/2006 |
| WO | WO-2006/056869 A3 | 6/2006 |

* cited by examiner

*Primary Examiner* — Tashiana Adams
(74) *Attorney, Agent, or Firm* — Greenblum & Bernstein, P.L.C.

(57) ABSTRACT

The invention encompasses a device for adjusting the trail of a cycle front wheel assembly including a hub for a wheel, the hub being adapted to receive an arrangement for tightening the wheel on a fork of the cycle and an interposed mechanism for adjusting the position of the fork center distance with respect to the transverse axis of the hub. The adjustment mechanism axially extends the hub and is configured and arranged to engage with a portion of the cycle fork so as to provide fork support as well as a predetermined setting of the position of the hub transverse axis with respect to the fork center distance. The invention also encompasses a wheel having such adjustment device, as well as a method of adjusting the trail.

36 Claims, 6 Drawing Sheets

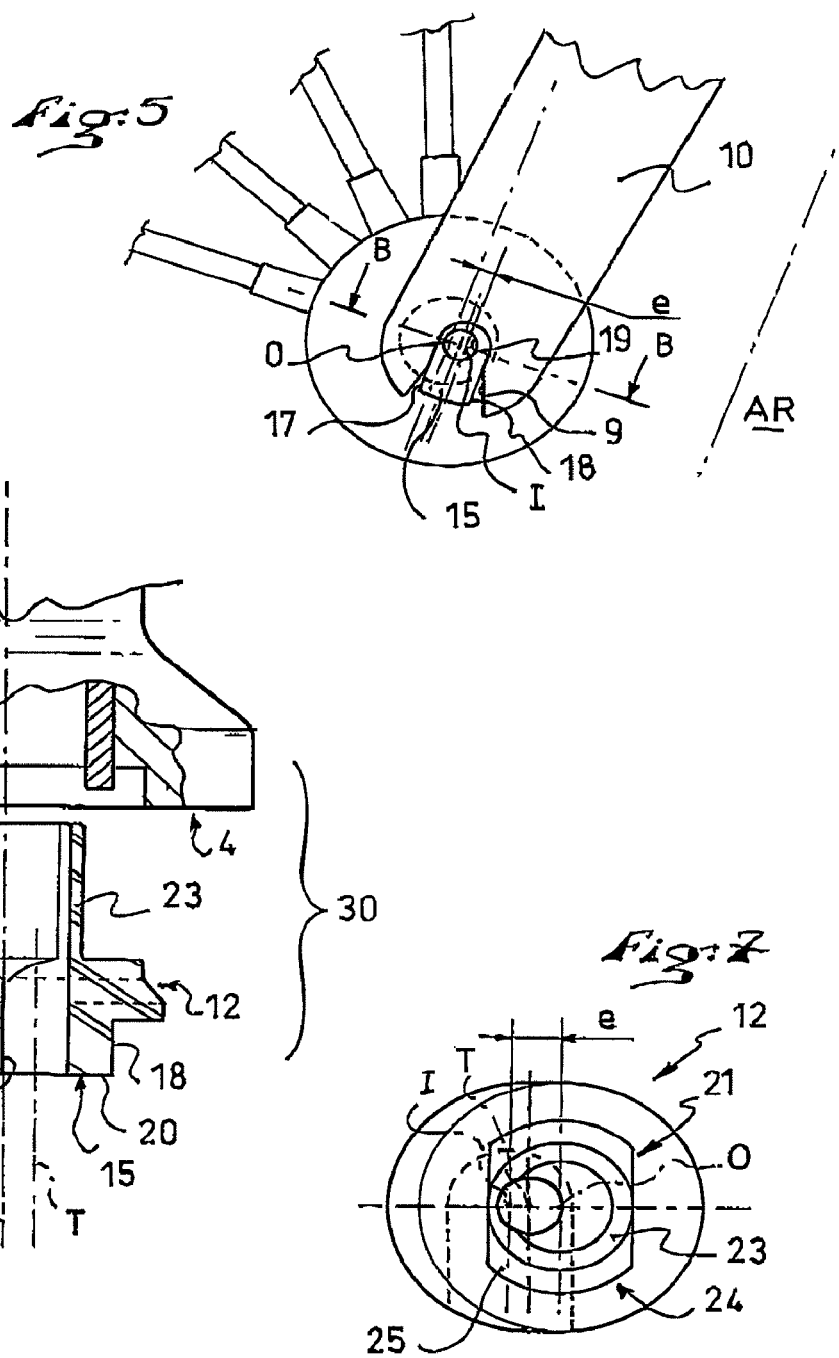

DEVICE FOR ADJUSTING THE TRAIL OF A CYCLE FRONT WHEEL ASSEMBLY, A WHEEL EQUIPPED WITH SUCH DEVICE, AND A METHOD OF USING SAME

CROSS-REFERENCE TO RELATED APPLICATION

This application claims priority under 35 U.S.C. §119 of French Patent Application No. 07 07847, filed on Nov. 8, 2007, the disclosure of which is hereby incorporated by reference thereto in its entirety.

BACKGROUND OF THE INVENTION

1. Field of the Invention

The invention relates to a cycle, such as a bicycle, and, more particularly, to a device for adjusting the trail of the front wheel assembly of such cycle, as well as a wheel equipped with such device, and a method of using such device.

2. Description of Background and Other Information

With respect to bicycles in particular, some riders need to be able to adjust certain geometric parameters of the cycle, which affect the position of the bicycle and/or the behavior of the bicycle under various conditions. Although certain parameters, such as the height of the saddle, the height of the handlebar, etc., usually are easily adjustable, adjusting other parameters is generally impossible, complicated, or difficult without special tools.

In particular, the relative head position with respect to the front wheel considerably affects the dynamic behavior of the bicycle. Certain important parameters affecting this position include the rake angle and the trail.

FIG. 1 shows a front wheel, with radius R, mounted on a fork and supported on the ground P. The rake angle corresponds to the angle A representing the angle between the steering axis D and the ground plane P. The trail h corresponds to the distance measured on a horizontal ground plane P, between the steering axis D and the wheel contact point B on the ground plane P. The offset C, sometimes referred to as fork rake, with regard to bicycles, corresponds to the distance between the hub axis O and the steering axis D. All of these parameters are interdependent and affect the dynamic behavior of the bicycle. FIG. 1 also shows, at least in part, the head tube, the top tube, and the down tube of the bicycle frame. If the top tube is horizontal and parallel to the ground plane P, the angle A can also be regarded as the head angle.

FIG. 2 is a graph that shows the trail h varying as a function of the rake angle A for various values of offset C, namely, 46, 50, and 54 mm, respectively. The relationship between the rake angle A and the trail h is expressed as follows:

$$h=(R\cdot\cos(A)-C)/\sin(A)$$

The graph shows that a small change in rake angle produces a relatively substantial change in the length of the trail. For example, a 1 degree rake angle variation produces a change in trail on the order of 6 mm on the ground.

With respect to bicycle behavior, each of the rake angle and the trail significantly affects the stability of the bicycle. In particular, a small trail can translate, for example, into a tendency for the bicycle to wander somewhat when the rider is out of the seat, such as during climbing or sprinting. Physically, this can be explained by a decrease in the moment about the steering axis generated by the lateral force at the bicycle ground contact point. A small trail produces a sensation for the rider of the bicycle being lighter and more maneuverable, but also more sensitive, which can generate sudden and involuntary changes in direction or heading. Therefore, it requires the rider to be more vigilant, more careful, while riding.

Furthermore, under certain aerodynamic conditions, an increase in trail can be advantageous In order to reduce the lateral moment and, therefore, to reduce the bicycle wander. Conversely, if the trail is small, the bicycle tends to be subject to the strong forces of a lateral moment caused by a lateral wind, and its stability is thereby affected.

Finally, controlling the rake angle can be difficult when the bicycle is being manufactured due to manufacturing tolerances. However, as shown in the graph of FIG. 2, a small rake angle variation substantially affects the trail and, therefore, the dynamic behavior of the bicycle. Thus, it is important to be able to adjust the trail in order to compensate for the deviations that are due to manufacturing tolerances.

Therefore, there is a need to be able to easily and efficiently adjust these parameters that are related to the relative positions of the steering head and the wheel on the ground, for example, either as a function of the riding conditions, or in order to compensate for manufacturing tolerances.

Certain prior art documents have proposed solutions for adjustment in the field of motorcycles, which are quite complicated to implement. For example, the patent document FR 2 880 609 and family member US 2008/0018076 relate to an improvement to an adjustable rake device for a motorcycle, which uses an eccentric principle to adjust the rake angle in the area of the head tube. This solution has the drawback of requiring intervention in the area of the head, which is quite difficult to carry out and requires special tools.

The patent document DE 102 29 740 relates to the construction of a motorcycle front wheel assembly, in which the braking system and the wheel axle are adjustable using two eccentric means. This system is complex and requires angular control of the adjustment between the brakes and the wheel, which is not easy to achieve.

Other systems for adjusting a wheel axle with eccentric means are available, such as an axle sold under the trademark "e-Axle®" by the Rekluse Motor Sports Company, for example. As with the aforementioned device, precise adjustment of such a system is complicated.

The patent document WO 2006/056869 and family member US 2007/0262556 relate to a method and a device for a front wheel of a vehicle, such as a motorcycle, which includes an adjustment of the position of the wheel axle with respect to the fork support by means of a fitting positioned in an opening of the fork and including a seat arranged in a predetermined position with respect to the fork opening, in order to receive one of the ends of a rotational pin of the wheel axle, so that the seat of the fitting assumes a predetermined relative position, which is selectively adjustable with respect to the fork so as to adjust the position of the rotational pin with respect to the fork. However, such an adjustment system is complicated to implement for a bicycle. Another drawback is created by a fitting that is inserted between the fork opening and the axle rotational pin, which itself is positioned in the opening. The pin therefore exerts forces on the fitting in the area of its seat, which can cause wear and tear, as well as clearances in the area of the fork axle.

SUMMARY OF THE INVENTION

The invention, among other things, overcomes the drawback found in the prior art devices. In particular, the invention provides a solution that is both easy to implement and reliable for modifying the characteristics related to cycle trail.

In one aspect of the invention, the device for adjusting the trail of a front wheel assembly of a cycle includes a wheel hub, the hub being adapted to receive an arrangement for tightening the wheel on a fork of the cycle, as well as a mechanism for adjusting the position of the fork center, or fork center axis, with respect to the hub transverse axis.

The adjustment mechanism can be considered to be part of the hub, or a fitting of the hub, which extends the hub along its transverse axis and is configured and arranged to be engaged with a portion of the cycle fork so as to provide fork support and a predetermined setting of the position of the hub transverse axis with respect to the fork center. Thus, the adjustment mechanism has two primary functions, one of which is to extend the hub in order to withstand fork support forces on the hub, and the other of which is to define a predetermined position for the fork center with respect to the hub transverse axis. This position determines the position of the trail, or of the rake of the cycle.

According to one embodiment of the invention, the adjustment mechanism is configured and arranged so as to define a predetermined offset or position of alignment of the hub transverse axis with respect to the fork center. Thus, depending upon the selected adjustment mechanism that is interposed, the length of the trail can be modified.

In particular, within the scope of the invention, the adjustment mechanism is in the form of at least one insert that is detachable with respect to the hub. It is also interchangeable with respect to the hub so as to permit selection of an insert from various inserts having respectively different adjustment characteristics. Such a solution has the advantage of eliminating the need to carry out the adjustment operations on the wheel or the hub axle, which usually require specific tools, such as wrenches, clamps, or the like.

According to one feature of the invention, such an insert includes a fork support portion, against which an opening portion of the fork is engaged. Thus, the insert is adapted to serve as an interface between the fork and the hub and to withstand the forces transmitted between the fork and the wheel. In particular, the interposed insert is configured to extend the hub axle, on the one hand, and to create an offset between the hub axle and the fork center, on the other hand.

According to a particular embodiment of the invention, particularly in the case of a conventional two-arm fork, the adjustment mechanism includes at least two inserts that axially extend each side of the hub, the inserts being configured to each engage with a respective fork portion. Each insert is also configured, when operating on the hub, to define a predetermined position for the hub transverse axis with respect to the fork center. The engagement of each insert with the fork can be done by means of a raised portion for supporting the insert, which engages in an opening of the fork or, conversely, by means of a raised portion of the fork that engages in an opening arranged in the insert.

According to another feature of such embodiment, the adjustment mechanism includes a set of at least two different pairs of inserts, whose characteristics for positioning the transverse axis with respect to the fork center are different from one pair to the other. Thus, it is easy to modify the trail simply by changing the pair of inserts on the hub. In particular, the device includes at least two pairs of inserts in the set, which are configured with a particular offset, thus selected from among other pairs of inserts, the deviation and/or direction of which varies from one pair to the other.

In a possible variation according to the invention, the device includes:
a. at least a first pair of inserts providing an offset of the hub transverse axis with respect to the fork center; and
b. at least one pair of inserts having a hub transverse axis aligned with respect to the fork center.

According a particular embodiment of the invention, each insert includes a tubular connecting portion that is adapted to be inserted complementarily, coaxially, and removably in an axial tubular portion of the hub. According to one embodiment, the connection between the insert and the hub is made merely by nesting; which can be frictional nesting. Other types of connection are within the scope of the invention, such as a screw connection or a bayonet-type nesting, for example. In any case, the connection is simple, so as to enable one to remove the insert easily and to replace it with another insert having different trail adjustment characteristics.

For example, the tubular portion can include a first arrangement for angular referencing with respect to the hub. The angular referencing arrangement makes it easier to position the insert in a limited number of selected angular positions with respect to the hub. For example, the angular referencing arrangement includes at least one flat portion that complementarily engages with a flat portion of the tubular portion receiving the hub body.

According to another characteristic, the fork support portions, included in the insert, are provided with surfaces for the support and rotational stop of the fork arm. In particular, the support and rotational stop surfaces are configured and arranged to position the fork center, so that it is offset with respect to the axis of the tubular connecting portion of the insert. Thus, each insert can include a shoulder that is adapted to support the open surfaces of a fork side. For example, the shoulder can include straight guiding surface portions.

These rotational stop surfaces of the insert are necessary due to the offset between the hub axis and the fork center on the insert. This offset creates a torsional torque which must be supported between the insert and the fork in order to prevent the insert from rotating.

These stop surfaces also serve to orient the insert properly with respect to the fork and with respect to an insert positioned on the second arm of the fork.

The insert is thus blocked in the direction of the hub transverse axis by conventional expedients for tightening the fork on the wheel, known to those skilled in the art. For example, such tightening means can take the form of a pair of axle nuts, one on each side of the fork, or the form of a skewer having a lock nut, such as an acorn nut, at one end, and a quick-locking (or quick-release) mechanism or a tightening nut, at the other end.

According to an alternative characteristic of the invention, the support and rotational stop surfaces are configured and arranged to align the fork centerline with respect to the axis of the tubular connecting portion of the insert. In this case, given that there is no offset, and therefore no torque, the support and rotational stop surfaces can simply include a tubular guiding surface portion.

According to another characteristic of the invention, a hole extends through each insert, enabling an axle or skewer for tightening the wheel on the fork to pass through. The hole can be made on the shoulder of the insert; it can be centered or off-centered with respect to this shoulder. Thus, the hole allowing passage of the axle or skewer for tightening the wheel on the fork can be off-centered with respect to the fork center.

The invention also relates to a cycle front wheel including a device such as described above.

The invention also relates to a method for adjusting the trail of a cycle front wheel assembly via an adjusting device including a hub for a wheel; the hub being adapted to receive an arrangement for tightening the wheel on a fork of the cycle, and a mechanism for positioning the center distance and for supporting the fork with respect to the hub transverse axis.

The method involves connecting, on the hub body, an adjustment mechanism that axially extends the hub and is configured and arranged to engage in an opening of the fork, so as to provide fork support as well as a predetermined position of the hub transverse axis with respect to the fork center distance.

In a particular embodiment, the method involves selecting the adjustment mechanism from a set including a plurality of pairs of inserts that are detachable and interchangeable with respect to the hub body and that have various positions for adjusting the hub transverse axis with respect to the fork center of the positioning and support arrangement, and then associating the selected pair with an insert on both sides of the hub.

BRIEF DESCRIPTION OF DRAWINGS

Other characteristics and advantages of the invention will become apparent from the description that follows, with reference to the annexed drawings showing, by way of non-limiting examples, how the invention can be embodied, and in which:

FIG. 5 is a side view of the device of FIGS. 3 and 4;

FIG. 6 is a top and partial cross-sectional view along the plane B of FIG. 5.

FIG. 7 is a view of an insert, from the inner side;

DETAILED DESCRIPTION OF THE INVENTION

Figure 1:
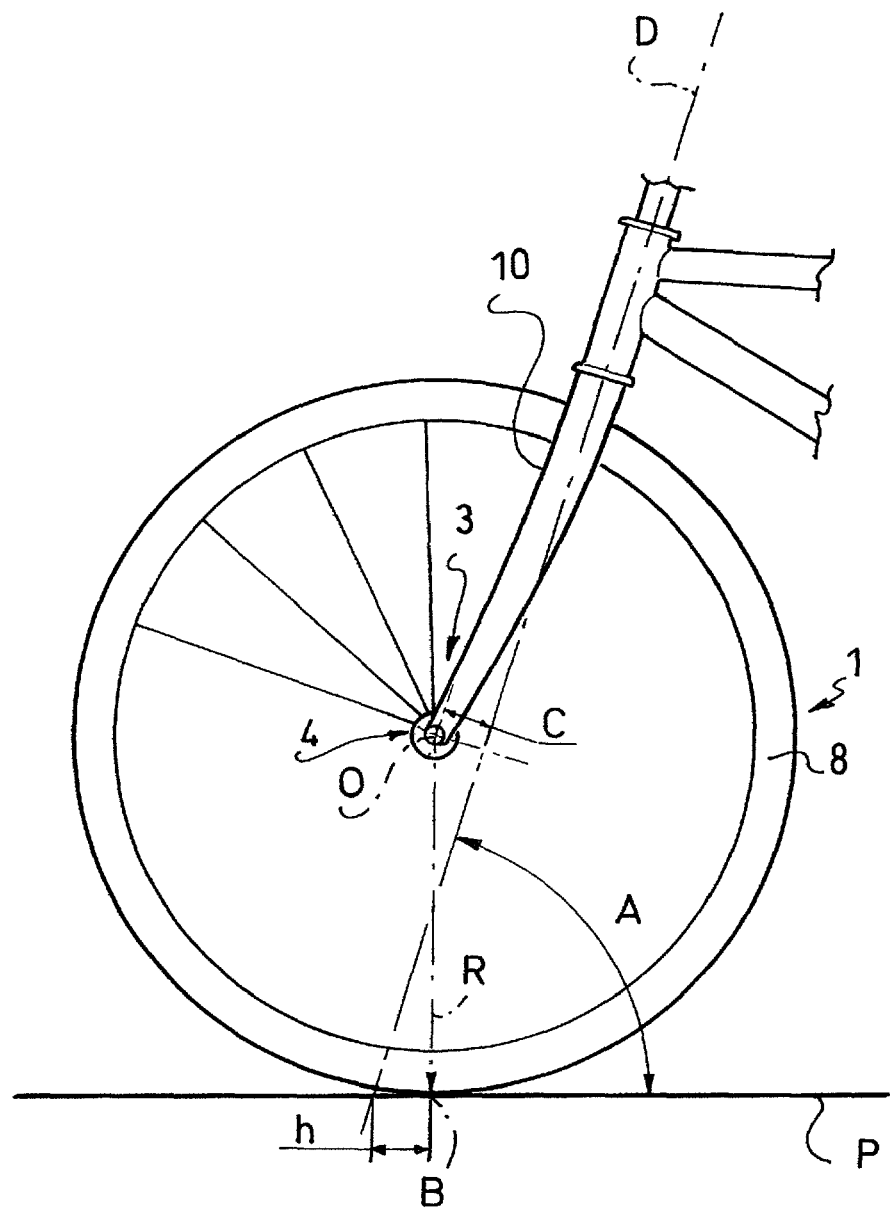
FIG. 1 is a schematic view of a cycle front wheel assembly for the purpose of explaining concepts relating to the invention.
Figure 2:
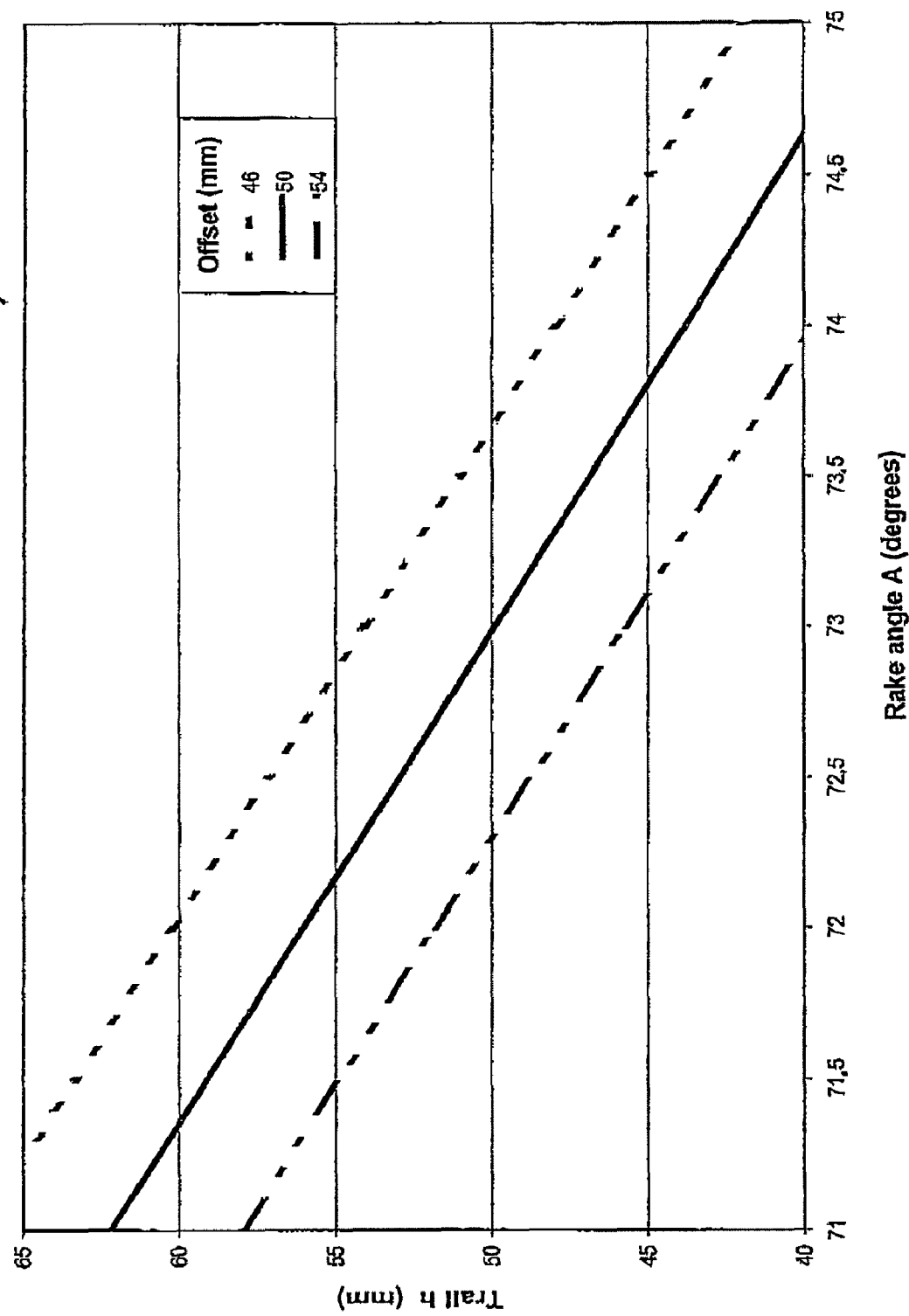
FIG. 2 is a graph showing the variation in trail (in millimeters) as a function of the rake angle (in degrees) for various offset values.
Figure 3:
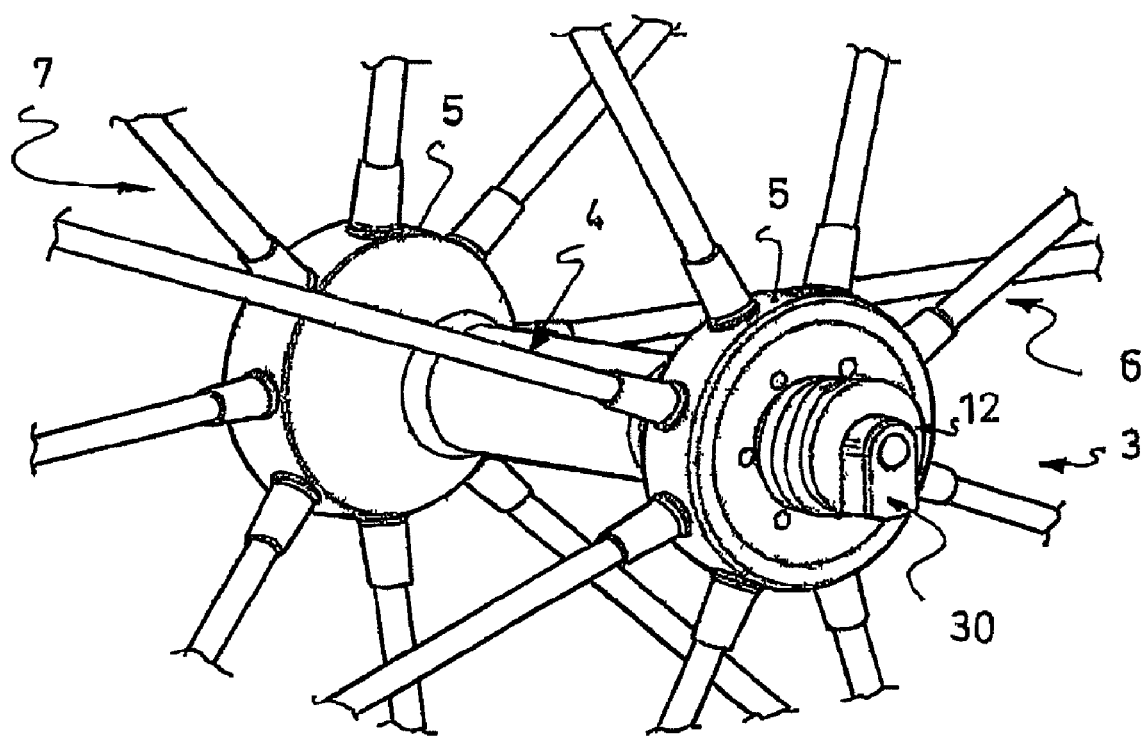
FIG. 3 is a perspective view of a device according to the invention, mounted on a wheel.

As shown in FIGS. 1 to 5, the invention relates to a device 3 for adjusting the trail h. These parameters are described above with respect to FIG. 1. The device is mounted on a hub 4, which extends along a transverse axis O. On its sides, the hub includes two lateral flanges 5 each receiving a spoke set 6, 7. Each spoke set is assembled to the flanges and to the rim 8, respectively. The spokes are mounted in tension between the hub and the rim and, as known, thereby provide the wheel with rigidity in both static and dynamic riding conditions. The device can adapt, for example, to a fork having two arms positioned on opposite sides of the wheel 1. However, the invention also encompasses a device for a cycle having only one fork arm arranged on only one side of the wheel, such as that disclosed in US 2006/0108858, the disclosure of which is hereby incorporated by reference thereto in its entirety.

The principle underlying the device according to the invention is to be able to easily adjust the positioning characteristics of the transversely extending hub axis O with respect to the transversely extending fork center axis I or, simply, the fork center. The hub transverse axis can be defined by the median transverse axis O passing though the center of the hub bearings. The fork center axis I can be defined as being substantially the axis passing transversely through the center of the opening of the fork arm with the fork in place, supported by the wheel, as shown in FIG. 1. In fact, the fork center axis I can be considered as lying within a transverse plane extending through the center of the opening of the fork. In a usual assembly, with the fork supported by the wheel (see FIG. 1), the hub transverse axis O and the fork center axis I are merged, i.e., they are co-extensive. However, a relative displacement of the two axes with respect to one another results in a direct variation of the parameters related to cycle trail h (see FIG. 1). Thus, according to a principle of the invention, an adjustment mechanism 30 is provided to affect the relative positioning of these two axes O and I so as to vary the length of the trail.

Figure 4:
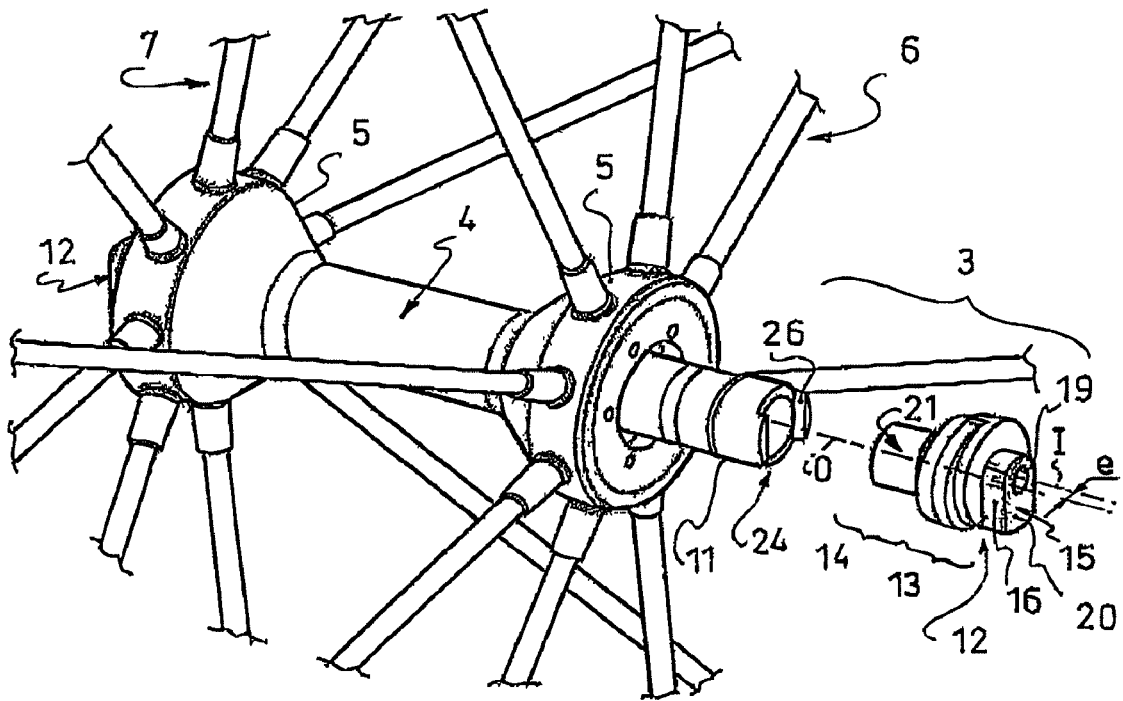
FIG. 4 is a perspective, exploded view of a device according to the invention.

As shown in FIG. 4, the underlying principle of the adjustable mechanism is to connect at least one detachable and interchangeable insert 12 on at least one side of the hub 4, in particular a free shaft portion 11. In a two fork arm configuration, two inserts are required, each extending the axle on each side of the hub. The insert 12 forms a detachable portion of the hub, i.e., a hub extension, which extends the hub axially outward and beyond the flanges. The term "extend" is to be considered in a broad sense and is non-limiting in terms of length. It does not necessarily mean that the hub and the inserts form a wider center distance than a conventional hub. In principle, the device according to the invention can apply to any standard type of cycle fork or, conversely, to forks with particular dimensions.

Thus, the insert includes two portions, i.e., an outer portion 13 nearer the fork, and an inner portion 14 nearer the hub. The outer portion 13 of the insert 12, in addition to including an enlarged portion extending axially between the hub and the fork (compare FIGS. 3 and 6), includes at least one raised fork support portion 15 that is configured and arranged to receive the support of a side of the fork 10. This portion includes fork rotational stop and support surfaces in the form of a shoulder 16, for example. The surfaces of the shoulder have straight surface portions 17, 18 that are parallel to one another and configured so as to engage complementarily in the U-shaped opening 9, i.e., the downwardly facing opening, of the side of the fork. Between the inner portion and the outer portion, a hole 19, i.e., a through-hole, having an axis T extends through the insert 12, i.e., through the hole 19 and in communication with the tubular connecting portion 23 and with the hub (further described below), as is evidenced by FIG. 4, e.g., providing passage for a skewer or axle of the device, as described above, for tightening the wheel on the fork. The hole 19 is positioned on the front surface 20 of the support portion 15. It can be centered or off-centered with respect to the straight surfaces 17, 18. Thus, the axis T can be aligned or off-centered with respect to the fork center distance I. The maximum off-centering of the axis T of the hole 19 is primarily a function of the diameter of the hub bearing. The surface portions 17, 18 of the shoulder 16 can be said to comprise front and rear surface portions that are structured and arranged to engage respective front and rear surfaces of the downwardly extending opening 9 of the fork.

On its inner portion 14, the insert 12 includes removable connection 21 for coupling the insert 12 to a tubular end portion 22 of the hub. This connection 21 here forms the tubular connecting portion 23 which adapts complementarily to the tubular end portion 22 of the hub. For example, the tubular connecting portion 23 of the insert has a smaller diameter than the diameter of the tubular end portion 22 of the hub, such that it is freely inserted inside the tubular end portion 22 when being slidably mounted. An inverse configuration of the portion 22 being inserted into the portion 23 is also encompassed by the invention. Also encompassed by the invention is a connecting arrangement of the screw or bayonet type, for example, between the tubular connecting portion 23 of the insert and the tubular end portion 22 of the hub.

As shown in FIGS. 4 and 7, the angular referencing arrangement 24 can be useful for setting the insert 12 in a predetermined angular position with respect to the hub, especially to allow correct positioning of the outer portion and of its shoulder so as to be opposite the fork. The referencing arrangement 24 can include a pair of flat portions 25 at the base of the tubular connecting portion 23 that complementarily engages in a flat portion 26 of the end portion of the hub. Upon engagement and after tightening of the device by the tightening arrangement, these flat portions prevent the insert from rotating with respect to the hub, thus correctly orienting the insert to be opposite the fork opening, and enabling the right and left inserts to be indexed.

As shown in FIG. 5, the shoulder is substantially offset toward the rear (AR) with respect to the inner tubular connecting portion 23 located on the inner portion of the insert. This offset causes an offset of the center distance of the fork that takes place on the shoulder with respect to the axis O of the hub, which is coaxial with respect to the portion 23. In the example shown, the offset is defined by a deviation e, with a position of the hub axle O at the front of the fork center distance I. A wheel or hub axis O, arranged further ahead by a certain deviation e with respect to a centered configuration, causes the ground contact to be displaced forward, and therefore results in a decrease in the trail h (see FIG. 1). The deviation e can be on the order of about 1 mm to 10 mm.

Figure 8:
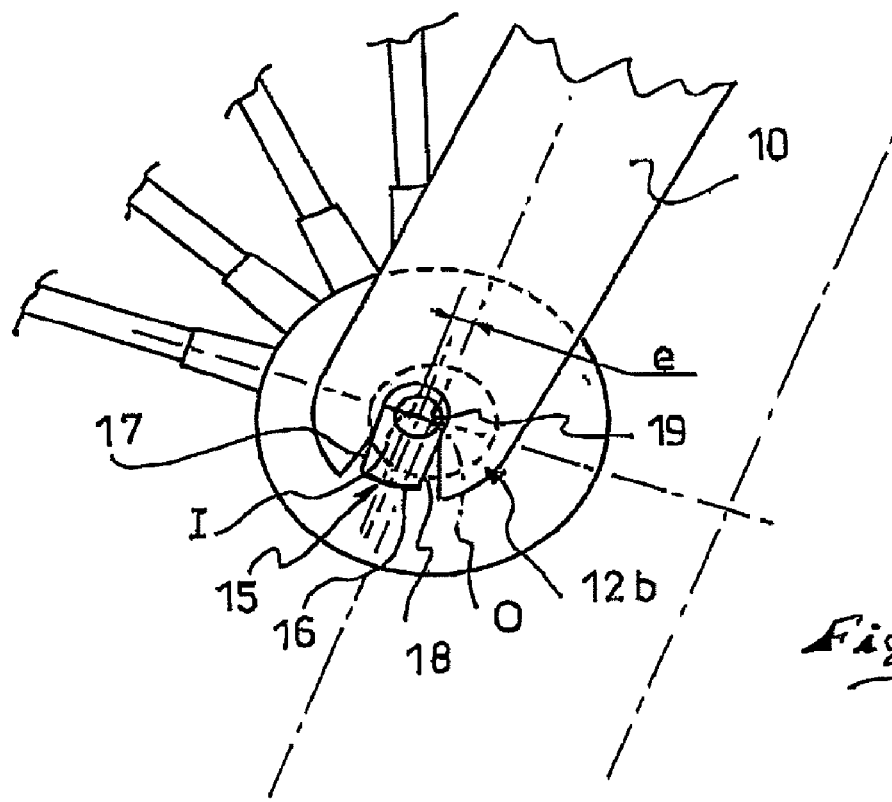
FIG. 8 is a side view of the device of the invention, mounted on the wheel in a second position.

FIG. 8 shows an increased trail configuration obtained by means of a pair of inserts 12b having different offset characteristics from the inserts 12 of the aforementioned embodiment. These characteristics can be obtained, for example, by simply inverting the left/right inserts 12b on the hub, or by means of new, i.e., different, inserts or by turning the wheel around if the wheel is symmetrical. In this case, the offset of the shoulder occurs forward with respect to the inner tubular portion 23. In this case, the wheel axle O is moved back by a certain deviation e with respect to the fork center, which results in moving back the ground contact point B and, therefore, in increasing the trail h in the e/sin(A) equation (FIG. 1).

Thus, the trail can be decreased or increased with the same pair of inserts, simply by inverting the assembly of the inserts on the two free portions of the hub shaft. Thus, according to one advantage of the invention, the same pair of inserts offers two possible adjustment positions, depending upon of the assembly of the inserts on the hub of the wheel.

Figure 9:
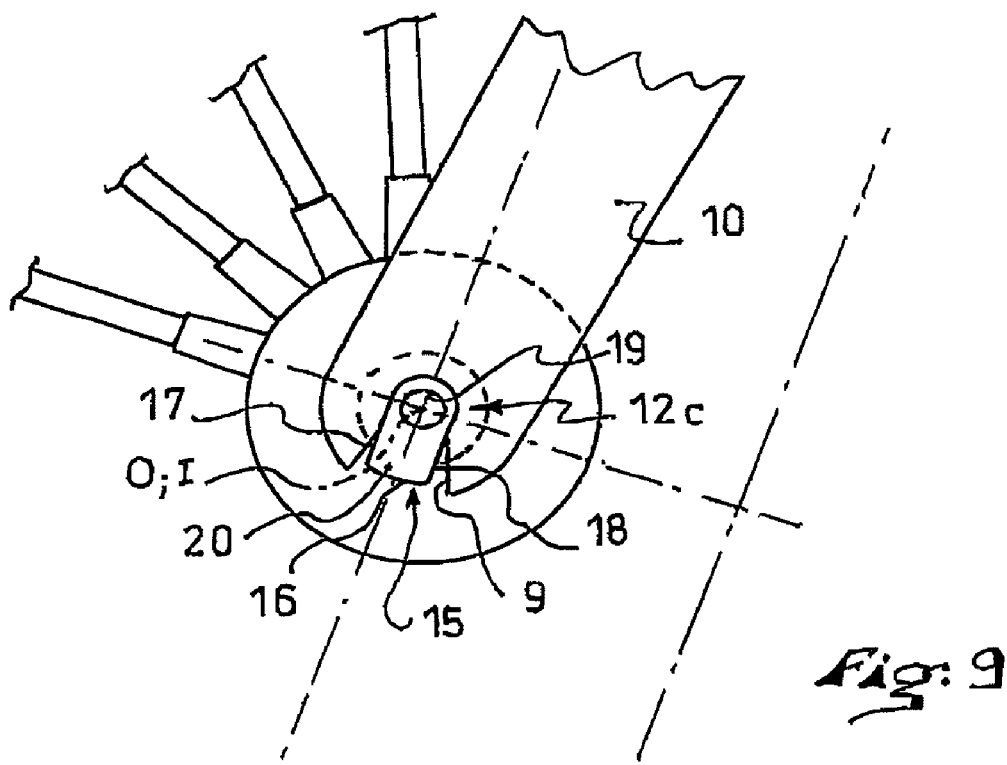
FIG. 9 is a side view of the device, with an insert whose fork support portion is aligned with the wheel axis.

In the configuration of FIG. 9, the two inserts 12c, on each side of the hub, are configured such that the median axis O of the fork support portion 15 is aligned with respect to the transverse axis of the tubular portion 23 corresponding to the axial direction I of the hub. The support portion of the insert 12c can be a shoulder 16 including straight guiding surface portions 17, 18 that are parallel to one another, as shown. However, a tubular or cylindrical guiding surface portion is within the scope of the invention because, due to the alignment, there is no torsional torque generated in the area of the shoulder.

The guiding surface portions 17, 18 can also be non-parallel, but can have a profile that widens out downward, complementarily with the profile of the opening 9 of the fork side 10.

The through hole 19 of the insert can be centered with respect to the front surface 20 of the shoulder, as shown, or off-centered on this surface. This hole provides a passage for the axle or skewer of the device for tightening the wheel, in particular the fork side, on the hub. The tightening is applied transversely in the direction of the axis I of the fork side 10 against the insert 12. Therefore, the insert is wedged between the shaft portion 11 of the hub and the fork side. Such a tightening device is known to those skilled in the art and is not described further herein.

The offset characteristics specific to the inserts can be adapted as a function of the desired trail adjustment. Thus, the direction of the offset of the axes, as well as the deviation between the axes can vary from one pair of inserts to another, so as to provide the user with a wide range of adjustment choices. The device of the invention offers an easy and reliable method for adjusting the trail of a cycle that does not require special tools.

According to a general principle, the method involves selecting a pair of inserts from a set of several pairs of inserts that are detachable and interchangeable with respect to the hub body and that have various positions for adjusting the hub transverse axis with respect to the fork center distance of the positioning and support arrangement, and then associating the selected pair with an insert on both sides of the hub. The method also includes the option of modifying the adjustment of the hub transverse axis with respect to the fork center distance by inverting the engagement of the inserts on the fork.

Each pair of inserts can include a visual indication showing the amount of off-centering, for example, the offset in millimeters between the axis O and the axis I. This visual indication can be in the form of color coding or digital marking, for example.

The invention is not limited to the particular embodiments described and shown above, but encompasses other equivalent embodiments. In particular, the invention encompasses an interposed adjustment mechanism that is part of the fork end rather than part of the hub. In such a case, the inserts can be mounted on the fork by any removable connecting mechanism, such as a screw connection or a clip connection.

The invention claimed is:

1. A device for adjusting the trail of a front wheel assembly of a cycle, said device comprising:
    a hub for a wheel, said hub having a transverse axis and being structured and arranged to receive an arrangement to tighten the wheel to a fork of the cycle;
    an adjustment mechanism to adjust a position of a fork center with respect to the transverse axis of the hub;
    said adjustment mechanism comprising a hub extension and being configured and arranged to engage a portion of the cycle fork so as to provide fork support as well as a predetermined position of the transverse axis of the hub with respect to the fork center;
    the hub extension of the adjustment mechanism including at least one insert structured and arranged to fit within a downwardly facing opening of the fork of the cycle;
    said insert being structured and arranged to offset the hub axis from the fork center.

2. A device according to claim 1, wherein:
    the insert is configured and arranged so as to define a predetermined offset or aligned position of the hub transverse axis with respect to the fork center.

3. A device according to claim 2, wherein:
    the insert is detachable and interchangeable with respect to the hub.

4. A device according to claim 2, wherein:
    the at least one insert comprises a plurality of different inserts, each of said inserts having characteristics for positioning the hub transverse axis with respect to the fork center are different from one to the other.

5. A device according to claim 3, wherein:
the insert includes a fork support portion adapted to be engaged with an opening portion of the fork.
6. A device according to claim 1, wherein:
the at least one insert comprises a set of at least two different pairs of inserts, each of said pairs of inserts having characteristics relating to a position of the hub transverse axis with respect to the fork center which are different from one pair to the other.
7. A device according to claim 6, wherein:
said at least two different pairs of inserts of the set are configured with respectively different amounts of offset of the hub axis with the fork center;
said offset amount and/or a direction of said offset varies from one pair to the other.
8. A device for adjusting the trail of a front wheel assembly of a cycle, said device comprising:
a hub for a wheel, said hub having a transverse axis and being adapted to receive an arrangement to tighten the wheel on a fork of the cycle;
an adjustment mechanism to adjust a position of a fork center distance with respect to the transverse axis of the hub;
said adjustment mechanism being effective to extend the hub axially and being configured and arranged to engage a portion of the cycle fork so as to provide fork support as well as a predetermined position of the transverse axis of the hub with respect to the fork center;
the adjustment mechanism including a set of at least two different pairs of inserts, each of said pairs of inserts having characteristics for positioning the hub transverse axis with respect to the fork center being different from one pair to the other;
at least a first of said pairs of inserts having an offset of said hub transverse axis with respect to the fork center;
at least one pair of inserts has a hub transverse axis aligned with respect to the fork center.
9. A device for adjusting the trail of a front wheel assembly of a cycle, said device comprising:
a hub for a wheel, said hub having a transverse axis and being adapted to receive an arrangement to tighten the wheel on a fork of the cycle;
an adjustment mechanism to adjust a position of a fork center distance with respect to the transverse axis of the hub;
said adjustment mechanism being effective to extend the hub axially and being configured and arranged to engage a portion of the cycle fork so as to provide fork support as well as a predetermined position of the transverse axis of the hub with respect to the fork center;
the adjustment mechanism being configured and arranged so as to define a predetermined offset or aligned position of the hub transverse axis with respect to the fork center;
the adjustment mechanism comprising a plurality of different inserts, each of said inserts having characteristics for positioning the hub transverse axis with respect to the fork center are different from one to the other;
each of said plurality of different inserts comprising a tubular connecting portion adapted to be inserted complementarily, coaxially, and removably in an axial tubular portion of the hub.
10. A device according to claim 9, wherein:
said tubular portions include an angular referencing arrangement with respect to the hub.
11. A device according to claim 10, wherein:
the angular referencing arrangement includes at least one flat portion that complementarily engages in a flat portion of the hub receiving tubular portion.
12. A device according to claim 9, wherein:
each insert includes support and rotational stop surfaces that are engageable in an opening of the fork side.
13. A device according to claim 12, wherein:
the support and rotational stop surfaces are configured and arranged to position the fork center so that it is offset with respect to the axis of the tubular connecting portion of the insert.
14. A device according to claim 13, wherein:
the support and rotational stop surfaces include a shoulder adapted to support open surfaces of a fork side.
15. A device according to claim 14, wherein:
the shoulder includes straight guiding surface portions.
16. A device according to claim 14, wherein:
the support and rotational stop surfaces are configured and arranged to position the fork center to be aligned with respect to the axis of the tubular connecting portion of the insert.
17. A device according to claim 16, wherein:
the support and rotational stop surfaces include a tubular guiding surface portion.
18. A device according to claim 16, wherein:
a hole extends through each insert, providing an axle for tightening the wheel on the fork to pass through.
19. A device according to claim 18, wherein:
the hole is off-centered with respect to the fork center.
20. A cycle comprising:
a frame;
a front fork;
a front wheel including a rim and a hub, the hub being connected to the rim, said hub having a transverse axis and being structured and arranged to receive an arrangement to tighten the wheel to the fork of the cycle;
a device for adjusting the trail of the front wheel, said device comprising:
an adjustment mechanism to adjust a position of a fork center with respect to the transverse axis of the hub;
said adjustment mechanism comprising a hub extension and being configured and arranged to engage a portion of the cycle fork so as to provide fork support as well as a predetermined position of the transverse axis of the hub with respect to the fork center;
the front fork including a downwardly facing opening;
the hub extension of the adjustment mechanism including at least one insert structured and arranged to fit within the downwardly facing opening of the front fork;
said insert being structured and arranged to offset the hub axis from the fork center.
21. A method for adjusting the rake of a cycle front wheel assembly, using the device of claim 1, said method comprising:
connecting on the hub body the adjustment mechanism to extend the hub axially and to engage in an opening of the fork, so as to provide fork support as well as a predetermined position of the transverse axis of the hub with respect to the fork center.
22. A method for adjusting the rake of a cycle front wheel assembly, using the device of claim 6, said method comprising:
selecting the adjustment mechanism by selecting a pair of inserts from said set of at least two different pairs of inserts, each of said inserts being detachable and interchangeable with respect to the hub body and having various positions for adjusting the transverse axis of the hub with respect to the fork center; and associating the selected pair to have an insert on each of two sides of the hub.

23. A device according to claim 1, wherein:

the at least one insert includes an axially extending outer portion structured and arranged to fit axially between the wheel and the fork.

24. A device according to claim 1, wherein:

the one insert of the hub extension of the adjustment mechanism comprises a first insert;

the hub extension of the adjustment mechanism further comprises a second insert;

each of the first and second inserts is structured and arranged to fit within a downwardly facing opening of the fork of the cycle;

the first insert is structured and arranged to offset the hub axis from the fork center;

the second insert is structured and arranged not to offset the hub axis from the fork center.

25. A device according to claim 1, wherein:

a through-hole extends through the insert along an axis offset from the fork center.

26. A device according to claim 25, wherein:

the insert has an inner portion and an outer portion, the inner portion being nearer the hub than the outer portion;

the through-hole of the insert extends through the inner and outer portions;

the through-hole is in communication with the hub and structured and arranged for passage of a skewer of the arrangement to tighten the wheel to the fork.

27. A device according to claim 2, wherein:

the insert has a fork support portion;

the fork support portion of the insert is configured and arranged to be fitted within an opening of the fork.

28. A device according to claim 27, wherein:

the fork support portion of the insert comprises front and rear surface portions configured and arranged to engage, respectively, front and rear surfaces of the opening of the fork.

29. A cycle according to claim 20, wherein:

the front fork includes a downwardly facing opening;

the one insert of the hub extension of the adjustment mechanism comprises a first insert;

the hub extension further comprises a second insert;

each of the first and second inserts is structured and arranged to fit within the downwardly facing opening of the front fork;

the first insert is structured and arranged to offset the hub axis from the fork center;

the second insert is structured and arranged not to offset the hub axis from the fork center.

30. A cycle according to claim 20, wherein:

a through-hole extends through the insert along an axis offset from the fork center.

31. A cycle according to claim 30, wherein:

the insert has an inner portion and an outer portion, the inner portion being nearer the hub than the outer portion;

the through-hole of the insert extends through the inner and outer portions;

the through-hole is in communication with the hub and structured and arranged for passage of a skewer of the arrangement to tighten the wheel to the fork.

32. A cycle according to claim 20, wherein:

the insert has an axially extending outer portion positioned axially between the rim and the fork.

33. A cycle comprising:

a frame;

a front fork having a downwardly facing opening;

a front wheel including a rim and a hub;

spokes connecting the hub to the rim;

the hub having a transverse axis and being configured and arranged to receive an arrangement to tighten the wheel on the fork of the cycle;

a device for adjusting the trail of the front wheel, said device comprising:

an adjustment mechanism to adjust a position of a fork center with respect to the transverse axis of the hub;

said adjustment mechanism comprising a portion configured and arranged to fit within the opening of the fork to provide fork support to set a predetermined position of the transverse axis of the hub with respect to the fork center.

34. A device according to claim 33, wherein:

the adjustment mechanism comprises at least one insert, said insert comprising said portion of the adjustment mechanism for providing said fork support.

35. A device according to claim 34, wherein:

the portion of the adjustment mechanism comprises front and rear surface portions configured and arranged to engage, respectively, front and rear surfaces of the opening of the fork.

36. A cycle according to claim 33, wherein:

the hub comprises a tubular end portion;

the adjustment mechanism comprises a hub extension removably connected to the tubular end of the end portion of the hub;

the hub extension of the adjustment mechanism includes at least one insert having an axially extending outer portion positioned axially between the rim and the fork.

* * * * *